UNITED STATES PATENT OFFICE.

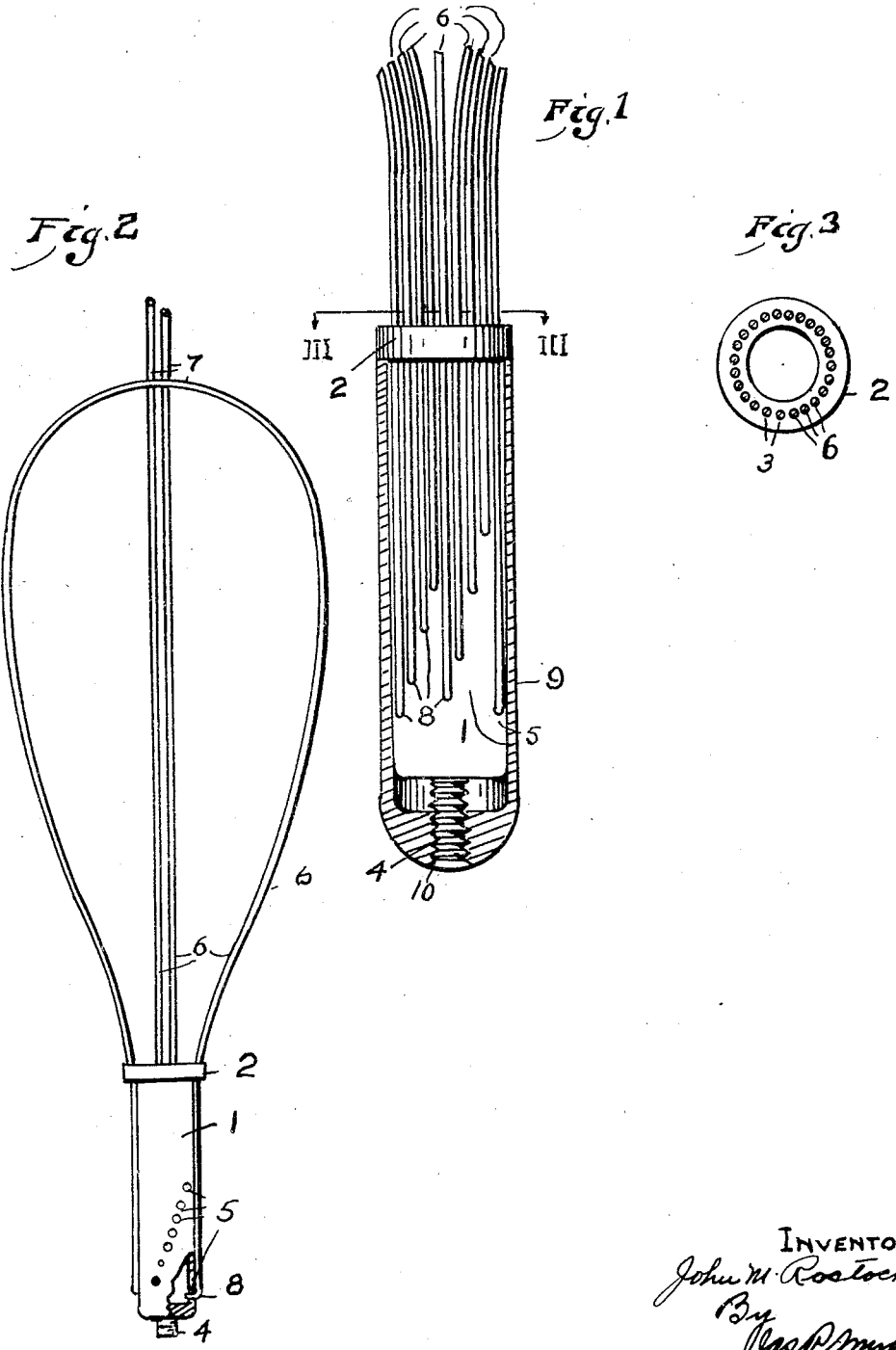

JOHN M. ROSTOCKI, OF PITTSBURGH, PENNSYLVANIA.

EGG-BEATER.

1,381,665. Specification of Letters Patent. Patented June 14, 1921.

Application filed January 6, 1921. Serial No. 435,372.

*To all whom it may concern:*

Be it known that I, JOHN M. ROSTOCKI, a subject of the Government of Poland, residing at Pittsburgh, in the county of Allegheny and State of Pennsylvania, have invented certain new and useful Improvements in Egg-Beaters, of which the following is a specification.

This invention relates to new and useful improvements in egg beaters, and the primary object thereof is to provide a device of the character described, in a manner as hereinafter set forth, which permits of the convenient removal and replacement of the whipping or beater elements which may have become broken by use, thereby eliminating the necessity of discarding the device for such reasons; and while the device is primarily intended for an egg beater, it will be understood that the same may be used for any purpose wherein it is found applicable.

Further objects of the invention are to provide a device of the class stated, which is simple in its construction and arrangement, strong, durable and efficient in its use, and inexpensive to manufacture.

To the accomplishment of these and such other objects as may hereinafter appear, the invention consists of the novel construction, combination and arrangement of parts herein specifically described, and illustrated in the accompanying drawing wherein is shown an embodiment of the invention, but it is to be understood that changes, variations, and modifications may be resorted to which come within the scope of the claims hereunto appended.

In the drawing forming a portion of this specification and wherein like numerals of reference designate corresponding parts throughout the several views:

Figure 1 is a vertical elevation of an egg beater in accordance with this invention, illustrating the handle member in cross section and the beater elements broken away.

Fig. 2 is a vertical elevation of the device with the handle member removed and some of the beater elements broken away.

Fig. 3 is a view on line II—II, Fig. 1.

Referring in detail to the drawing 1 indicates a shank having its upper end formed with an annular flange 2, which latter is provided with a plurality of perforations 3. The lower end of the shank 1 is formed with the vertical threaded stem 4.

The shank 1 is preferably cylindrical in contour and has its periphery provided with four rows of perforations 5, each row extending lengthwise with respect to the shank. The perforations of each row are arranged out of alinement with respect to each other, and regularly spaced one in advance of the other.

The perforations of each row extend at right angles with respect to the perforations of the two adjacent rows, and are diametrically opposed, perforation for perforation, to the perforations of the opposed row. The perforations of one pair of opposed rows of perforations are in staggered relation with respect to the perforations of the other pair of opposed rows of perforations.

The shank 1 carries a plurality of beater elements 6, preferably constructed from flexible wire. Each of the flexible beater elements 6 is bent over to form the enlarged upper portion 7, and has its free ends inserted through diametrically opposed perforations in the annular flange 2, as clearly shown in Fig. 3 of the drawing.

Each of the free ends of each beater element 6 is formed with an angularly disposed portion 8, which is inserted in respective opposed perforations of opposed rows of perforations, thereby anchoring the beater element to the shank.

The arrangement of the perforations 5 in the shank 1 is such as to permit of the use of beater elements constructed from the same lengths of wire, positioning each of said elements upon different parts of the periphery of the shank, and permitting the enlarged portions 7 of the various elements to overlap each other without interference with each other.

It will be obvious that any one of the elements 6 may be removed and replaced without disturbance to any other of the said elements.

A handle member 9 completely incloses the shank 1 and is secured to the latter by means of the threaded aperture 10, in the lower end of the handle member, which engages the threaded stem 4. The upper end of the handle member 9 abuts against the lower face of the annular flange 2.

What I claim is:

1. A device for the purpose set forth comprising a shank provided with a series of lengthwise extending rows of apertures, the apertures of each row arranged out of alinement with respect to each other and one in advance of the other, sets of overlapping whipping elements, each of said elements formed from a resilient member of the same length having its ends anchored in apertures of opposed rows of apertures.

2. An egg beater comprising a hollow shank provided with a series of lengthwise extending rows of perforations, the perforations of each row arranged out of alinement with respect to each other and one in advance of the other, sets of overlapping whipping elements, each of said elements consisting of a resilient member of the same length having its ends anchored in perforations of opposed rows of perforations, said shank at its inner end provided with an annular flange having perforations for the passage of said elements.

In testimony whereof I affix my signature.

JOHN M. ROSTOCKI.